US007898721B2

(12) United States Patent
Gan et al.

(10) Patent No.: US 7,898,721 B2
(45) Date of Patent: Mar. 1, 2011

(54) METHOD AND DEVICE FOR ADJUSTING DRIVING VOLTAGE OF MICROELECTROMECHANICAL OPTICAL DEVICE

(75) Inventors: Feng-Yuan Gan, Hsinchu (TW); Han-Tu Lin, Wuci Township, Taichung County (TW); Jia-Fam Wong, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 877 days.

(21) Appl. No.: 11/030,526

(22) Filed: Jan. 6, 2005

(65) Prior Publication Data

US 2006/0077513 A1 Apr. 13, 2006

(30) Foreign Application Priority Data

Sep. 27, 2004 (TW) .............................. 93129205 A

(51) Int. Cl.
*G02B 26/00* (2006.01)

(52) U.S. Cl. ........................ 359/290; 359/291; 359/292

(58) Field of Classification Search ................. 359/290, 359/291, 292, 298, 242, 237, 295, 296
See application file for complete search history.

(56) References Cited

U.S. PATENT DOCUMENTS

| | | | | |
|---|---|---|---|---|
| 5,510,989 | A * | 4/1996 | Zabler et al. | 701/1 |
| 5,932,938 | A * | 8/1999 | Shimamori | 307/125 |
| 6,402,302 | B1 * | 6/2002 | Ozaki et al. | 347/65 |
| 6,422,677 | B1 * | 7/2002 | Deshpande et al. | 347/14 |
| 6,674,562 | B1 | 1/2004 | Miles | 359/291 |
| 6,680,792 | B2 | 1/2004 | Miles | 359/291 |
| 6,940,285 | B2 * | 9/2005 | Montrose et al. | 324/420 |
| 6,961,035 | B2 * | 11/2005 | Endo et al. | 345/87 |
| 6,972,881 | B1 * | 12/2005 | Bassetti | 359/198.1 |
| 7,106,353 | B2 * | 9/2006 | Shigeta | 345/698 |
| 7,155,125 | B2 * | 12/2006 | Mori | 398/45 |
| 2004/0001033 | A1 * | 1/2004 | Goodwin-Johansson et al. | 345/31 |
| 2004/0189837 | A1 * | 9/2004 | Kido | 348/241 |
| 2005/0007652 | A1 * | 1/2005 | Winkler et al. | 359/298 |
| 2005/0040773 | A1 * | 2/2005 | Lebens et al. | 315/291 |
| 2005/0286891 | A1 * | 12/2005 | Sakai et al. | 398/45 |
| 2006/0044928 | A1 * | 3/2006 | Chui et al. | 365/232 |
| 2006/0067653 | A1 * | 3/2006 | Gally et al. | 385/147 |

FOREIGN PATENT DOCUMENTS

| | | |
|---|---|---|
| JP | 1164826 | 5/1999 |
| JP | 200098347 | 7/2000 |

OTHER PUBLICATIONS

CN Office Action mailed Feb. 9, 2007.

* cited by examiner

*Primary Examiner*—Ricky L Mack
*Assistant Examiner*—Brandi N Thomas
(74) *Attorney, Agent, or Firm*—Jianq Chyun IP Office

(57) ABSTRACT

A driving voltage adjusting device for a microelectromechanical optical (MEMO) device. The adjusting device comprises a parameter generator and a driving device. The driving device outputs an adjusting driving voltage to the MEMO device to a parameter from the parameter generator.

16 Claims, 5 Drawing Sheets

METHOD AND DEVICE FOR ADJUSTING DRIVING VOLTAGE OF MICROELECTROMECHANICAL OPTICAL DEVICE

BACKGROUND

The invention relates to a driving voltage adjusting device and in particular to method and device for adjusting driving voltage of a microelectromechanical optical (MEMO) device and a display using the same.

Current thin film technology has enabled the development of sophisticated integrated circuits. This semiconductor technology has also been leveraged to create microelectromechanical structures. Microelectromechanical structures, comprising microsensors, microgears, micromotors, and other microengineered devices, are typically capable of motion or applying force. Currently, microelectromechanical devices are being developed for a wide variety of applications as they provide the advantages of low cost and extremely small size (on the order of microns). For example, microelectromechanical optical (MEMO) devices are employed in display technology.

A microelectromechanical optical device, such as an interferometric modulator, comprises an actuator operated by vibration or movement. The actuator, however, may suffer from increased mechanical stress or deterioration of organic material properties when the microelectromechanical optical device is operated for a long time or under various ambient temperature conditions, lowering the performance of thereof and reducing reliability due to an unsuitable driving voltage.

FIG. 1 illustrates an interferometric modulator 100. As shown in FIG. 1, the interferometric modulator 100 comprises a transparent substrate 101 and an actuator 107 disposed thereon. The actuator 107 comprises a plurality of top electrodes 102, a bottom electrode 104, and a plurality of posts 106. Each top electrode 102 may be a stack layer disposed on the transparent substrate 101. For example, the top electrode 102 may comprise an indium tin oxide (ITO) layer and an overlying chromium layer. An insulating layer (not shown), such as a silicon oxide or aluminum oxide layer, is formed on each top electrode 102. The bottom electrode 104 acts as a mechanical layer for the actuator 107, comprising aluminum or nickel. The top and bottom electrodes 102 and 104 are separated by the posts 106 comprising, for example, photoresist materials, to form air gaps g therebetween.

Visible light may pass through the air gaps g from the transparent substrate 101 and be reflected from the bottom electrode 104, inducing interference. Visible light with various wavelengths may be formed by the interference and air gaps g to provide visible light with different colors. If a voltage (driving voltage) is applied between one of the top electrodes 102 and the bottom electrode 104, two electrodes 102 and 104 may make contact, as the right side of the interferometric modulator 100 shown in FIG. 1. When this occurs, light cannot pass through the air gap g, resulting in formation of a dark region. As mentioned, when the interferometric modulator 100 is operated under different ambient temperatures, the width of the air gap g may vary with the deteriorated organic material properties of the post 106. Here, the ambient temperature indicates that the environment temperature of the location where the interferometric modulator 100 is situated. That is, the ambient temperature may vary with different climates or locations. The varied width of the air gap g induces an unstable driving voltage between the top and bottom electrodes 102 and 104. Additionally, the unstable driving voltage may also be induced because the mechanical stress of the bottom electrode (mechanical layer) 104 is increased with increased operating time of the interferometric modulator 100.

SUMMARY

A method and device for adjusting driving voltage of a microelectromechanical optical (MEMO) device and a display using the same are provided. An embodiment of a driving voltage adjusting device for a microelectromechanical optical device comprises a parameter generator for outputting a parameter and a driving device for outputting an adjusting driving voltage to the microelectromechanical optical device according to the parameter.

The parameter generator can be a temperature sensor or timer and the parameter can be temperature or time.

An embodiment of a method for adjusting a driving voltage of a microelectromechanical optical device is provided. A parameter is generated. The driving voltage of a microelectromechanical optical device is adjusted according to the parameter.

An embodiment of a display comprises a microelectromechanical optical device, a parameter generator for outputting a parameter, and a driving device for outputting an adjusting driving voltage to the microelectromechanical optical device according to the parameter.

DESCRIPTION OF THE DRAWINGS

Method and device for adjusting driving voltage of microelectromechanical optical device will become more fully understood from the detailed description given hereinbelow and the accompanying drawings, given by way of illustration only and thus not intended to be limitative of the invention.

DETAILED DESCRIPTION

Figure 1:
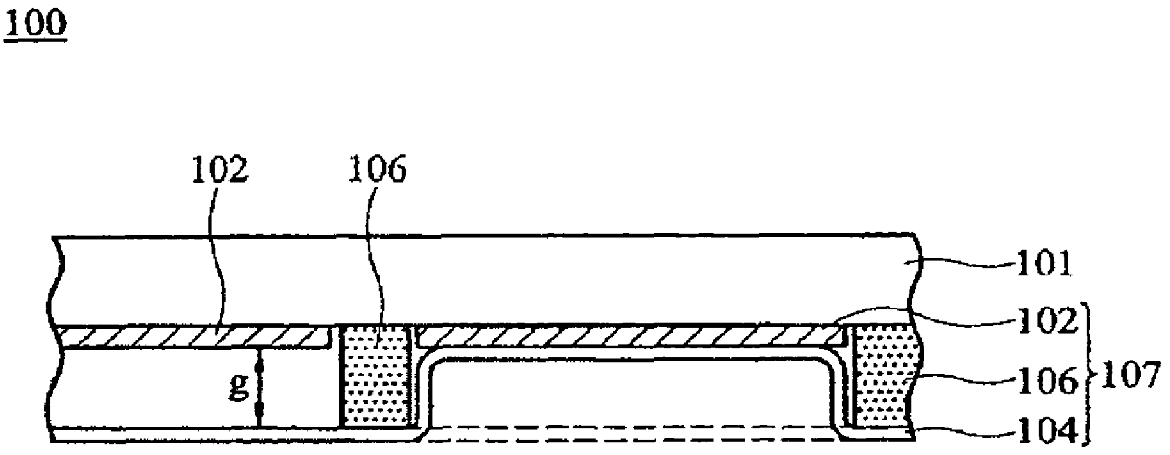
FIG. 1 (PRIOR ART)
FIG. 1 is a cross-section of an interferometric modulator.
Figure 2A:
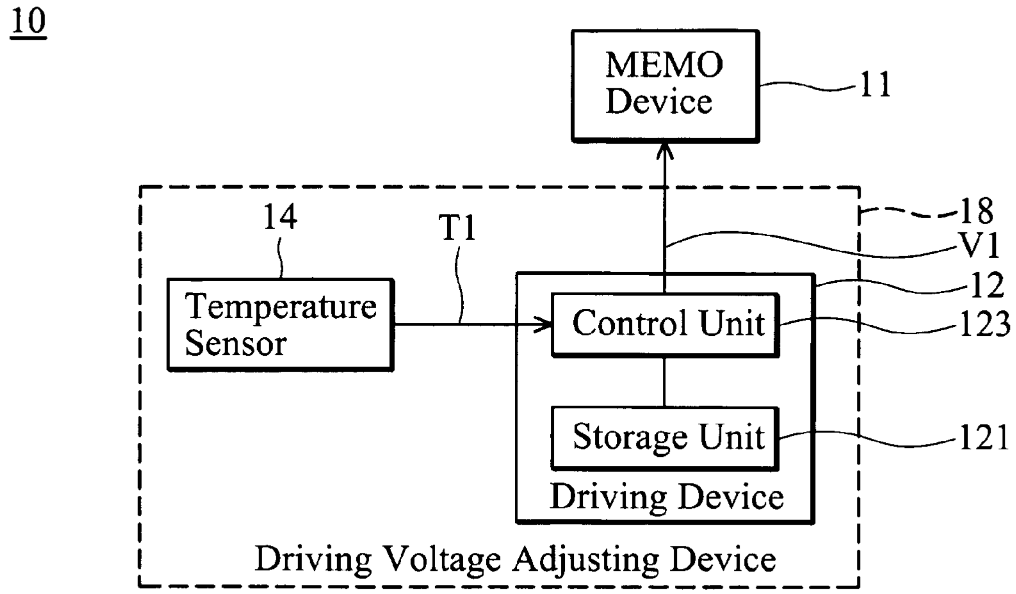
FIG. 2*a* is a block diagram of a display of an embodiment of the invention.
Figure 2B:
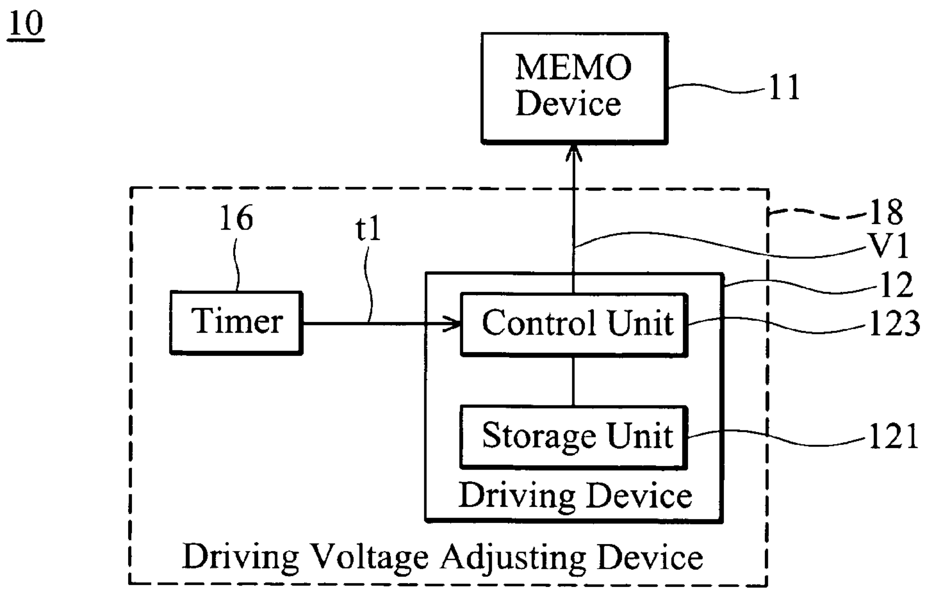
FIG. 2*b* is a block diagram of a display of an embodiment of the invention.

FIGS. 2*a* and 2*b* illustrate two embodiments of a display 10 of the invention. The display 10 comprises a microelectromechanical optical device 11 and a driving voltage adjusting device 18. The microelectromechanical optical device 11, such as an interferometric modulator, activated by vibration or movement, serves as a display device. The driving voltage adjusting device 18 comprises a driving device 12 and a parameter generator. In some embodiments, the parameter generator may comprise a temperature sensor 14 (as shown in FIG. 2*a*) or a timer 16 (as shown in FIG. 2*b*). Moreover, the parameter generator is employed to generate a parameter. If the temperature sensor 14 serves as the parameter generator, the parameter is temperature. Conversely, if the timer 16 serves as the parameter generator, the parameter is time. Here, the temperature parameter indicates the ambient temperature of the microelectromechanical optical device 11 and the time parameter the operating time thereof.

Figure 4A:
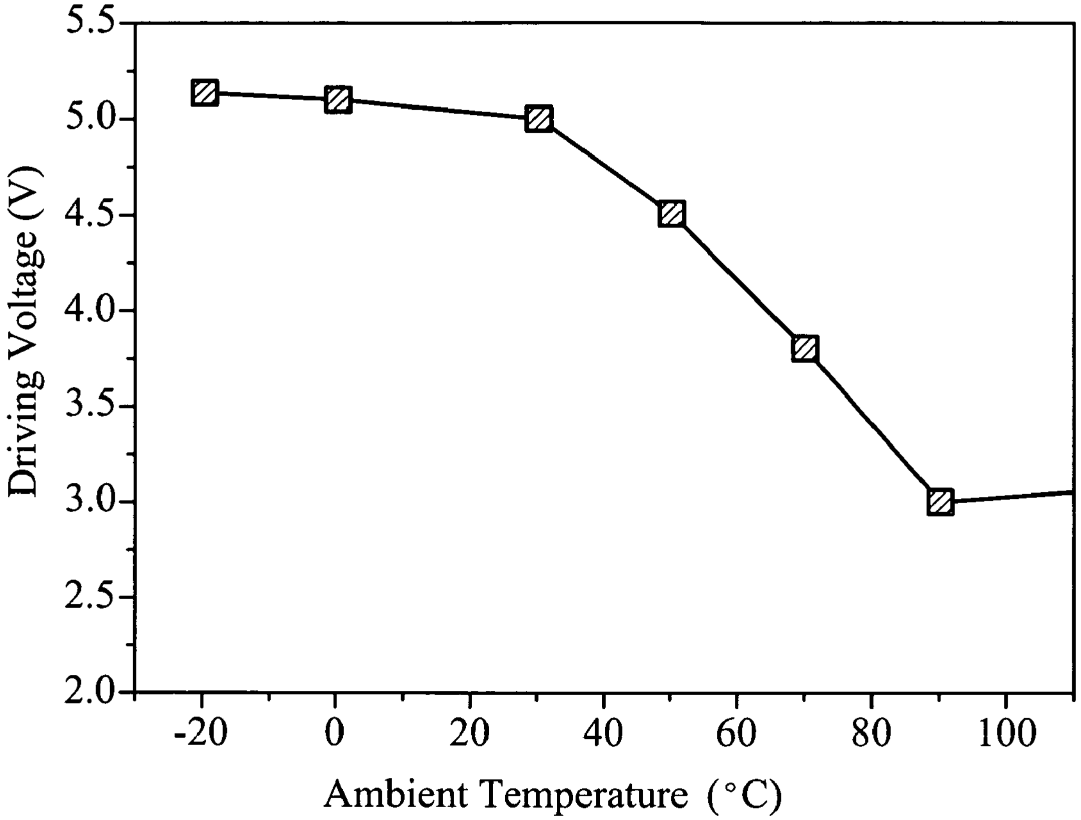
FIG. 4*a* is a graph showing the relationship between the ambient temperature and the driving voltage of the interferometric modulator.
Figure 4B:
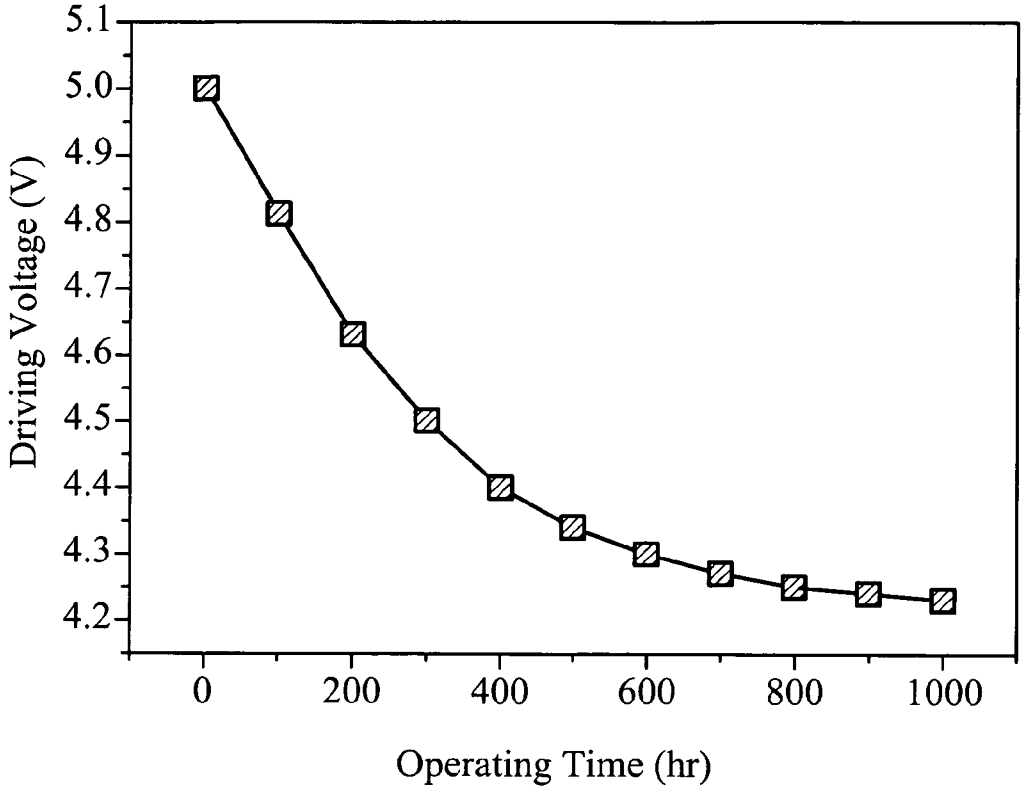
FIG. 4*b* is a graph showing the relationship between the operating time and the driving voltage of the interferometric modulator.

The driving device 12 outputs an adjusting driving voltage V1 to the microelectromechanical optical device 11 according to the parameter thereby adjusting the driving voltage. The driving device 12 comprises a storage unit 121 and a control unit 123. The storage unit 121 is employed to store a look up table. Here, if the temperature sensor 14 serves as the parameter generator, the look up table is a temperature look up table and comprises different ambient temperature conditions of the microelectromechanical optical device 11 and corresponding driving voltages thereof. Conversely, if the timer 16 serves as the parameter generator, the look up table is a time look up table and comprises different operating time conditions of the microelectromechanical optical device 11 and corresponding driving voltages thereof. The temperature look up table is depicted by a graph of the relationship between the ambient temperature and the driving voltage of the interferometric modulator, as shown in FIG. 4*a*. Moreover, the time look up table is depicted by a graph of the relationship between the operating time and the driving voltage of the interferometric modulator, as shown in FIG. 4*b*. The control unit 123 outputs an adjusting driving voltage V1 to the microelectromechanical optical device 11 according to the temperature look up table and the temperature parameter T1 generated by the temperature sensor 14 or according to the time look up table and the time parameter t1 generated by the timer 16.

Note that the driving voltage adjusting device 18 may comprise the temperature sensor 14 and the timer 16. In this case, the storage unit 121 must store the temperature and time look up tables. Moreover, the control unit 123 may control the driving voltage according to the temperature parameter T1 generated by the temperature sensor 14 or the time parameter t1 generated by the timer 16.

Figure 3:
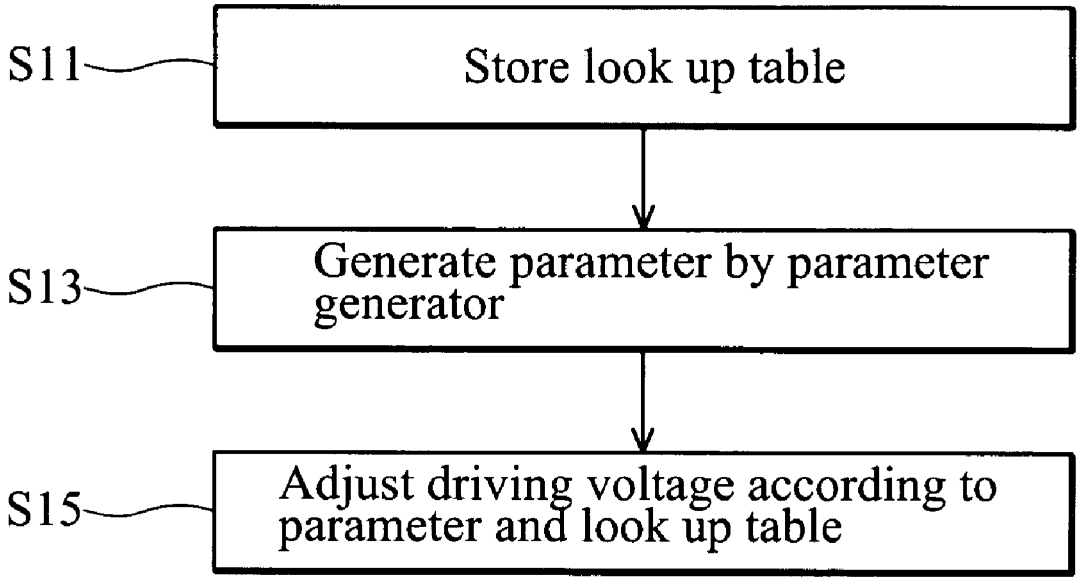
FIG. 3 is a flowchart of a method for adjusting a driving voltage of a microelectromechanical optical device of an embodiment of the invention.

FIG. 3 shows a flowchart of a method for adjusting a driving voltage of a microelectromechanical optical device 11 of an embodiment of the invention. In step S11, a look up table is stored. For example, a temperature look up table comprising different ambient temperature conditions of the microelectromechanical optical device 11 and the corresponding driving voltages thereof (as shown in FIG. 4*a*) or a time look up table comprising different operating time conditions of the microelectromechanical optical device 11 and the corresponding driving voltages thereof (as shown in FIG. 4*b*) is stored in the storage unit 121 of the driving device 12. In step S13, a parameter is generated by a parameter generator. For example, a temperature parameter T1 is generated by detecting the ambient temperature of the microelectromechanical optical device 11 using the temperature sensor 14 or a time parameter ti generated by counting the operating time of the microelectromechanical optical device 11 using the timer 16. In step S15, the driving voltage of the microelectromechanical optical device 11 is adjusted according to the parameter and the relative look up table. For example, an adjusting driving voltage V1 is output to the microelectromechanical optical device 11 by acquiring the temperature parameter T1 and the temperature look up table or acquiring the time parameter t1 and the time look up table using the control unit 123 of the driving device 12, thereby controlling the driving voltage of the microelectromechanical optical device 11.

In this embodiment, for example, the driving voltage of the microelectromechanical optical device 11 (interferometric modulator) is about 5V when the display 10 is operated at room temperature (25 C). When the operating environment of the display 10 is changed, the temperature sensor 14 detects the ambient temperature (for example, 45 C) and then outputs the temperature parameter T1. Thereafter, the control unit 123 of the driving device 12 outputs an adjusting driving voltage V1 to the microelectromechanical optical device 11 according to the temperature parameter T1 and the temperature look up table (as shown in FIG. 4*a*) stored in the storage unit 121, thereby adjusting the driving voltage to 4.5 V.

Moreover, the driving voltage of the microelectromechanical optical device 11 (interferometric modulator) is about 5V during initial operation of the display 10. When the operating time of the display 10 is increased, the timer 16 counts the operating time of the microelectromechanical optical device 11 (for example, 400 hr) and then outputs the time parameter t1. Thereafter, the control unit 123 of the driving device 12 outputs an adjusting driving voltage V1 to the microelectromechanical optical device 11 according to the time parameter t1 and the time look up table (as shown in FIG. 4*b*) stored in the storage unit 121, thereby adjusting the driving voltage to 4.4 V.

Accordingly, a suitable driving voltage can be output to drive the microelectromechanical optical device when the ambient temperature or operating time of the display 10 is changed. That is, the microelectromechanical optical device can be stably operated, thereby increasing reliability and retarding device deterioration.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving voltage adjusting device for a microelectromechanical optical device employed in a display, comprising:
- a parameter generator for providing a parameter; and
- a driving device for providing an adjusting driving voltage to the microelectromechanical optical device employed in the display in accordance with the parameter, wherein the microelectromechanical optical device displays an image in accordance with the adjusting driving voltage, wherein the parameter is an ambient temperature of the microelectromechanical optical device.

2. The device as claimed in claim 1, wherein the driving device comprises:
- a storage unit for storing a look up table; and
- a control unit for controlling the driving voltage in accordance with the parameter and the look up table.

3. The device as claimed in claim 2, wherein the parameter generator comprises a temperature sensor.

4. The device as claimed in claim 3, wherein the look up table comprises different ambient temperature conditions and corresponding driving voltages for the microelectromechanical optical device.

5. A method for adjusting a driving voltage of a microelectromechanical optical device employed in a display, comprising:
- generating a parameter; and
- adjusting the driving voltage of the microelectromechanical optical device employed in the display in accordance with the parameter, such that the microelectromechanical optical device displays an image in accordance with an adjusting driving voltage, wherein the parameter is an ambient temperature of the microelectromechanical optical device.

6. The method as claimed in claim 5, wherein generating the parameter comprises:
- detecting the ambient temperature; and
- outputting the parameter in accordance with the ambient temperature.

7. The method as claimed in claim 5, wherein adjusting the driving voltage comprises:
- acquiring the parameter and a look up table; and
- outputting the adjusting driving voltage to the microelectromechanical optical device in accordance with the parameter and the look up table.

8. A display, comprising:
- a microelectromechanical optical device serving as a display device; and
- a driving voltage adjusting device electrically coupled to the microelectromechanical optical device, comprising:
  - a parameter generator for providing a parameter; and
  - a driving device for providing an adjusting driving voltage to the microelectromechanical optical device in accordance with the parameter, wherein the microelectromechanical optical device displays an image in accordance with the adjusting driving voltage, wherein the parameter is an ambient temperature of the microelectromechanical optical device.

9. A driving voltage adjusting device for a microelectromechanical optical device employed in a display, comprising:
- a parameter generator for providing a parameter; and
- a driving device for providing an adjusting driving voltage to the microelectromechanical optical device employed in the display in accordance with the parameter, wherein the microelectromechanical optical device displays an image in accordance with the adjusting driving voltage, wherein the parameter is an operating time of the microelectromechanical optical device.

10. The device as claimed in claim 9, wherein the driving device comprises:
- a storage unit for storing a look up table; and
- a control unit for controlling the driving voltage in accordance with the parameter and the look up table.

11. The device as claimed in claim 10, wherein the parameter generator comprises a timer.

12. The device as claimed in claim 11, wherein the look up table comprises operating time conditions and corresponding driving voltages for the microelectromechanical optical device.

13. A method for adjusting a driving voltage of a microelectromechanical optical device employed in a display, comprising:
- generating a parameter; and
- adjusting the driving voltage of the microelectromechanical optical device employed in the display in accordance with the parameter, such that the microelectromechanical optical device displays an image in accordance with an adjusting driving voltage, wherein the parameter is an operating time of the microelectromechanical optical device.

14. The method as claimed in claim 13, wherein generating the parameter comprises:
- detecting the operating time of the microelectromechanical optical device; and
- outputting the parameter in accordance with the operating time.

15. The method as claimed in claim 13, wherein adjusting the driving voltage comprises:
- acquiring the parameter and a look up table; and
- outputting the adjusting driving voltage to the microelectromechanical optical device in accordance with the parameter and the look up table.

16. A display, comprising:
- a microelectromechanical optical device serving as a display device; and
- a driving voltage adjusting device electrically coupled to the microelectromechanical optical device, comprising:
  - a parameter generator for providing a parameter; and
  - a driving device for providing an adjusting driving voltage to the microelectromechanical optical device in accordance with the parameter, wherein the parameter is an operating time of the microelectromechanical optical device.

* * * * *

UNITED STATES PATENT AND TRADEMARK OFFICE

CERTIFICATE OF CORRECTION

PATENT NO. : 7,898,721 B2
APPLICATION NO. : 11/030526
DATED : March 1, 2011
INVENTOR(S) : Feng-Yuan Gan et al.

It is certified that error appears in the above-identified patent and that said Letters Patent is hereby corrected as shown below:

On the cover page of the patent grant, please replace item (73) Assignee's Name with Au Optronics Corporation, HSINCHU (TW)

QUALCOMM MEMS TECHNOLOGIES, INC., SAN DIEGO, CA (US)

Signed and Sealed this
Twentieth Day of December, 2011

David J. Kappos

David J. Kappos
*Director of the United States Patent and Trademark Office*